United States Patent Office 3,379,779
Patented Apr. 23, 1968

3,379,779
BIS-ARYL METHYLENE MALONONITRILES
Albert F. Strobel, Delmar, and Sigmund Catino, Castleton, N.Y., assignors to General Aniline & Film Corporation, New York, N.Y., a corporation of Delaware
No Drawing. Continuation-in-part of application Ser. No. 198,755, May 31, 1962. This application Jan. 23, 1967, Ser. No. 610,765
16 Claims. (Cl. 260—248)

ABSTRACT OF THE DISCLOSURE

Substantially colorless compounds which exhibit a prominent absorption peak between 250 m$\mu$ and 400 m$\mu$ and which are outstanding absorbents for ultra-violet radiation and as stabilizers for organic materials against the degradative effect of such radiation are characterized as monocyclicheterocyclic, aryl methylene malononitriles, said heterocyclics being of the group containing 5 and 6 members in the ring and wherein the hetero atom is at least one of the group of oxygen, nitrogen and sulfur.

---

This invention relates to new and useful compounds which impart to organic materials superior resistance to degradation and deterioration when they are exposed to actinic radiation, and in particular to ultra-violet radiation. This invention further relates to processes for the preparation of new and useful compounds of the type hereinbefore described. The compounds with which this invention is concerned are characterized as aryl hetero methylene malononitriles.

While various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested s absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining aryl hetero methylene malononitriles with organic materials, there results compatible combinations with a vast number of film forming plastics, resins, gums, waxes and the like, which combinations further exhibit outstanding ultraviolet absorbing properties within the generally encountered ultraviolet regions of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds of this invention also absorbs some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds of the present invention do not require an hydroxyl group, the presence thereof is not disadvantageous, or a detriment where alkaline sensitivity is no problem.

It is therefore an object of the present invention to provide new and useful compounds characterized by outstanding ultra-violet absorbing properties.

It is still another object of this invention to provide new and useful aryl hetero methylene malononitriles which are outstanding ultra-violet absorbing compounds.

It is a still further object of the present invention to provide processes for the preparation of new and useful ultraviolet absorbing compounds.

It is a still further object of the present invention to provide processes for the preparation of new and useful ultraviolet absorbing compounds which are characterized as aryl hetero methylene malononitriles.

Other objects will appear hereinafter as the description proceeds.

The aryl hetero methylene malononitriles which are contemplated in this invention exhibit a prominent peak or peaks between 250 A. and 400 A. and are devoid of nitro groups and nuclear bonded amino groups and have the following general formula:

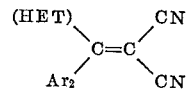

wherein (HET) represents a 5- or 6-membered heterocyclic nucleus or a benzo (5- or 6-membered) heterocyclic nucleus containing at least one pair of conjugated double bonds and wherein the hetero atoms are oxygen, nitrogen and/or sulfur and Ar$_2$ represents an aromatic carbocyclic nucleus.

Examples of suitable heterocycles are: thiophene, furane, pyrrole, α-pyran, α-pyrone, pyridine, 1,2-dihydropyridine, oxazole, thiazole, isoxazole, isothiazole, pyrazole, 3-isopyrazole, imidazole, 2-isoimidazole, 1,2,3-triazole, 1,2,4-triazole, tetrazole, 1,3,4-oxadiazole, 1,2,5-oxadiazole, 1,2,3-thiadiazole, 1,2,3-oxathiazole, pyridazine, pyrimidine, pyrazine, 1,3,5-triazine, and fused ring systems of benzene nuclei and naphthalene nuclei with the aforementioned heterocyclics, e.g., benzothiophene, benzofurane, quinoline, phthalazine, benzimidazole, 1,2,3-benztriazole, benzoxazole.

The hetero nuclei may contain alkyl substituted alkyl, halogen, acyl, sulfonyl, carboxamido, oxy and similar inert substituents which may vary the ultra-violet absorption spectrum but which do not affect the function and stability of the compounds. Such substituents include: alkyl, methyl, ethyl, n-propyl, iso-propyl, n-butyl, iso-butyl, tertiary-butyl, secondary-butyl, n-amyl, iso-amyl, tertiary-amyl and the other isomeric amyls, n-hexyl, iso-hexyl and the other isomeric hexyls, n-heptyl, iso-heptyl and the other isomeric heptyls, n-primary nonyl (nonyl-1), nonyl-(2), nonyl-(3), nonyl-(5), 2-methyl-octyl-2, 4-ethyl-heptyl-4, 2-methyl-4-ethyl-hexyl-4, n-primaryl octyl, octyl-(2) (capryl), 2-methyl-3-ethyl-pentyl-3, 2,2,4-trimethyl-pentyl-4, 2-ethyl-hexyl-1, 3-ethyl-hexyl-3, 2-methyl-heptyl-2, 3-methyl-heptyl-3, 4-methyl-heptyl-4, n-primary decyl (decyl-1), decyl-4 (secondary decyl) 2-ethyl-octyl-3 (tertiary decyl) 4-propyl-heptyl-4 (tertiary decyl), undecyl-1 (n-primary decyl), undecyl-2 (n-secondary decyl), dodecyl-1 (n-dodecyl), tridecyl-1 (n-tridecyl), tridecyl-7, 3-ethyl-undecyl, tetradecyl-1 (n-tetradecyl), pentadecyl-1 (n-pentadecyl), pentadecyl-8, hexadecyl (cotyl), heptadecyl-9, octadecyl-1, 2-methyl heptadecyl-2, eicosyl-1, docosyl-1, tricosyl-12, tetracosyl, tricapryl, pentacosyl, hexacosyl, heptacosyl, octacosyl, nonacosyl, myrisyl (30 carbons);

alkenyl—
    allyl ($CH_2=CHCH_2-$)
    methallyl ($CH_2=C(CH_3)CH_2-$)
    crotyl ($CH_3CH=CHCH_2CH_2-$)
    butenyl-1 ($CH_2=CH-CH-CH_3$)
    pentenyl-1
    $\gamma$-isopropyl allyl
    $\beta$-ethyl-$\gamma$-propyl allyl
    2-methyl-octenyl-6
    decenyl-1
    decenyl-2
    undecenyl
    dodecenyl-2
    octadecenyl
    docosenyl
    pentamethyl eicosenyl;

substituted alkyl—
    cyanoethyl
    cyano-n-propyl
    cyano-isopropyl
    cyano-n-butyl
    cyano-isobutyl
    cyano-n-amyl
    cyanohexyl
    cyanoheptyl
    cyano-n-octyl
    cyano-nonyl
    cyanodecyl
    cyanolauryl
    cyanostearyl and the like
    hydroxyethyl
    hydroxy-n-propyl
    hydroxy-isopropyl
    hydroxy-n-butyl
    hydroxy-isobutyl
    hydroxy-n-amyl
    hydroxy-isoamyl
    cyano-isoamyl
    hydroxy-hexyl
    hydroxy-heptyl
    hydroxy-nonyl
    hydroxy-decyl
    hydroxy-lauryl substituted alkyl—continued
    hydroxy-stearyl and the like
    carbomethoxyethyl
    carbomethoxypropyl
    carbomethoxybutyl
    carbomethoxyamyl
    carbomethoxyhexyl
    carbathoxyethyl
    carbothoxypropyl
    carbethoxybutyl, etc.
    carbopropoxyethyl
    carbopropoxypropyl
    carbopropoxybutyl, etc.
    carbobutoxyethyl
    carbobutoxybutyl, etc.
    chloroethyl
    chloropropyl (N-propyl, isopropyl)
    chlorobutyl (N-butyl, isobutyl, etc.)
    chloroamyl
    chlorohexyl
    chlorodecyl
    chlorolauryl, and the like
    bromoethyl
    bromopropyl (N-propyl, isopropyl)
    bromobutyl (N-butyl, isobutyl, etc.)
    bromoamyl
    bromohexyl
    bromodecyl
    bromolauryl, and the like
    methoxyethyl
    methoxypropyl (N-propyl, isopropyl)
    methoxybutyl (N-butyl, isobutyl, etc.)
    methoxyamyl
    methoxyhexyl
    methoxydecyl
    methoxylauryl, and the like
    ethoxyethyl
    ethoxypropyl (N-propyl, isopropyl)
    ethoxybutyl (N-butyl, isobutyl, etc.)
    ethoxyamyl
    ethoxyhexyl
    ethoxydecyl
    ethoxylauryl, and the like
    hydroxyethoxyethyl
    hydroxyethoxypropyl
    hydroxyethoxybutyl
    hydroxethoxyamyl
    hydroxypropoxyethyl
    hydroxypropoxypropyl
    hydroxypropoxybutyl
    hydroxypropoxyamyl
    hydroxybutoxyethyl
    hydroxybutoxypropyl
    hydroxybutoxybutyl
    hydroxybutoxamyl halogen—
    fluorine
    chlorine
    bromine
    iodine acyl—
    acetyl
    propionyl
    butanoyl
    amoyl, etc.
    benzoyl
    toluoyl
    naphthoyl, etc.

sulfonyl—
    $CH_3SO_2$
    benzene sulfonyl
    toluene sulfonyl, etc.

oxy—
    hydroxy
    methoxy oxy—continued
  ethoxy
  hydroxyethoxy, etc.
carboxamide (—CONH₂)—
  N-methyl carboxamido (CONCH₃)
  N-ethyl carzoxamido
  N-dimethyl carboxamido
  N-diethyl carboxamido, etc.
Suitable aryls for Ar₂ include:
  aryl—
    phenyl
    tolyl
    xylyl
    cumyl
    α-naphthyl
    β-naphthyl
    α-anthraquinonyl
    β-anthraquinonyl
    phenanthranyl
    diphenyl and the alkyl substituted
      derivatives thereof
  substituted aryls, e.g.—
    anisole
    phenetole
    p-diethoxyphenyl
    1-methoxy phenanthryl
    α-naphthylmethylether
    β-naphthylmethylether
    α-napthylethylether
    β-naphthylethylether
    hydroxyethyl phenyl
    hydroxypropyl phenyl
    chlorophenyl
    bromophenyl
    1,2-dichlorophenyl
    1,3-dichlorophenyl
    1,3,5-trichlorophenyl
    1,2-dibromophenyl
    α-chlorotolyl
    m-chlorotolyl
    m-bromotolyl
    bromo-o-xylyl
    α,β-dichloro naphthyl
    4-bromoacenaphthyl
    carboxphenyl
    carboxytolyls
    carboxyxylyls
    carbalkoxylphenyls, e.g.
      carbomethoxylphenyl
      carboethoxylphenyl
    carbalkoxytolyls, e.g.
      carbomethoxytolyls
    acetophenyl
    propionphenyl
    butyrophenyl
    lauroylphenyl
    stearoylphenyl
    p-acetotolyl
    o-acetotolyl
    α-benzoyl naphthyl
    β-benzoyl naphthyl
    acetominophenyl
    acet-methylamino phenyl
    o-acetoaminotolyl
    p-acetoaminotolyl
    α-acetoaminonaphthyl
    β-acetoaminonaphthyl
    propio-aminophenyl
    butyro-aminophenyl
    o-propio-aminotolyl
    p-propio-aminotolyl
    o-butyroaminotolyl
    p-butyroaminotolyl
    o-lauroylaminotolyl
    p-lauroylaminotolyl substituted aryls, e.g.—continued
    o-stearoylaminotolyl
    sulfamyl phenyl
    sulfamyl naphthyl The general procedure for preparing the compounds of this invention involves a condensation of an aryl hetero ketone with malononitrile or with cyanoacetamide followed by dehydration to the dinitrile.

Suitable ketones include:

2-acetamido-4-phenyl-5-thiazolyl phenyl ketone
2-benzofuryl phenyl ketone
2-benzothiazolyl phenyl ketone
5-bromo-2-thienyl phenyl ketone
6-(benzyloxy)-3-methyl-2-benzofuryl phenyl ketone
5-bromo-2-benzofuryl-p-bromophenyl ketone
5,7-dibromo-2-benzofuryl phenyl ketone
4,5-dibromo-2-thienyl phenyl ketone
4,5-diiodo-2-pyrryl phenyl ketone
4,5-diiodo-2-thienyl phenyl ketone
3,4-dimethoxyphenyl-2-furyl ketone
1,2-dimethyl-3-phenyl-3-pyrrolidyl phenyl ketone
3,5-dimethyl-4-isoxazolyl pentamethyl phenyl ketone
2,6-dimethyl-3-pyridyl phenyl ketone
4,5-dimethyl-3-pyrryl phenyl ketone
4,5-dimethyl-2-thiazolyl phenyl ketone
2,5-dimethyl-3-thiazyl phenyl ketone
2,5-dimethyl-3-thienyl p-tolyl ketone
2,5-dimethyl-3-thienyl p-ethylphenyl ketone
2,3-dimethyl-1-naphthyl-2-thienyl ketone
2,5-diphenyl-3-furyl phenyl ketone
4,5-diphenyl-3-isoxazolyl phenyl ketone
1,5-diphenyl-3-pyrryl phenyl ketone
2-furyl-o-tolyl ketone
2-furyl-p-tolyl ketone
5-iodo-2-thienyl phenyl ketone
5-methyl-3-isoxazolyl phenyl ketone
2-methyl-3-indolyl phenyl ketone
2-methyl-3-indolyl p-tolyl ketone
2-methyl-1-naphthyl-2-thienyl ketone
2-methyl-5-benzoxazolyl phenyl ketone
5-methyl-2-thiazolyl phenyl ketone
5-methyl-3-phenyl-4-isoxazolyl phenyl ketone
5-methyl-1-phenyl-1,2,3-triazol-4-yl phenyl ketone
2-methyl-3-pyridyl phenyl ketone
1-naphthyl-2-pyridyl ketone
1-naphthyl-4-pyridyl ketone
1-naphthyl-3-pyridyl ketone
2-naphthyl-3-pyridyl ketone
phenyl-5-phenyl-3-furyl ketone
phenyl-5-phenyl-3-isoxazolyl ketone
phenyl-5-phenyl-3-pyrryl ketone
phenyl-5-phenyl-2-pyrryl ketone
phenyl-5-phenyl-2-thienyl ketone
phenyl-4-thiazolyl ketone
phenyl-5-thiazolyl ketone
phenyl-2-thienyl ketone
phenyl-3-pyrazolyl ketone
phenyl-2-pyridyl ketone
phenyl-4-pyridyl ketone
phenyl-1,2,5-triphenyl-3-pyrryl ketone
phenyl-1-phenyl-4-pyrazolyl ketone
phenyl-6-phenyl-3-pyridyl ketone
phenyl-2-furyl ketone
p-methoxyphenyl-2-thienyl ketone
2-furyl-m-methoxyphenyl ketone
p-hydroxyphenyl-5-methyl-2-thienyl ketone
2,5-dichloro-3-thienyl-phenyl ketone
2,6-dimethyl-4-pyridyl-phenyl ketone
3-allyl-4-hydroxyphenyl-5-ethyl-2-thienyl ketone
3,5-dichloro-2-hydroxyphenyl-2-furyl ketone
3,5-dichloro-4-methoxy-2-pyridyl phenyl ketone
3,5-dichloro-2-pyridyl phenyl ketone
3,5-dimethyl-4-isoxazolyl phenyl ketone
2,4-dimethyl-5-oxazolyl phenyl ketone
p-ethylphenyl-5-ethyl-2-thienyl ketone 4-tertiarybutyl-3-chloro-2-hydroxyphenyl-2-furyl ketone
5-ethyl-2-thienyl-p-methoxyphenyl ketone
6-allyloxy-2,4-xylyl-2-furyl ketone
3'-chloro-4'-methoxy-4-biphenyl-yl-2-thienyl ketone
o-chlorophenyl-5-chloro-2-thienyl ketone In addition to the above contemplated derivatives, polyoxyalkylated derivatives thereof are within the purview of this invention. Any of the aforementioned compounds containing at least one reactive hydrogen atom may be reacted with an alkylene oxide or a compound functioning as an oxide (or mixtures thereof) such as: ethylene oxide, phopylene oxide, butylene oxide, butylene dioxide, isobutylene oxide, glycidol, epichlorohydrin butadiene dioxide, isobutylene oxide, styrene oxide, and the like to yield the corresponding polyoxyalkylated products.

Among the types of compounds which are reactive in this manner are: hydroxy compounds, amide compounds, carboxycompounds, etc. From one to about 200 moles of oxyalkylating agent may be condensed with the said reactive compounds.

The following examples will serve to illustrate the present invention without being deemed limitative thereof. Parts are by weight unless otherwise indicated.

Example 1

I. Preparation of

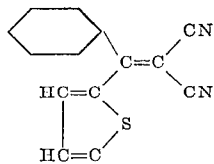

phenyl-2-thienylmethylene malononitrile

Into a dry flask fitted with a stirrer, thermometer, reflux condenser to the top of which is attached a drying tube containing anhydrous calcium chloride, and heating mantle, there are added 20.0 grams of $\alpha$-cyano-$\beta$-phenyl-$\beta$-(2-thienyl) acrylamide and 67 grams (40 mls.) of phosphorus oxychloride. The reaction mixture is heated to 60° C. and stirred until complete solution occurs. Then the stirring is continued for ¾ hr. longer at 60° C. The reaction mixture is cooled to room temperature and drowned into 500 grams of ice-water slush. The slurry is stirred 1½ hrs. at 0–5° C., filtered and washed with 1000 grams of water. The crude product is dried at 80° C. and then stirred with 300 mls. benzene. The slurry is clarified to remove insolubles. The clear benzene extract is evaporated and the residue is recrystallized from 375 mls. isopropanol using animal charcoal. The product is filtered from isopropanol at 5° C. and dried at 80° C. There is obtained 11.9 grams of phenyl-2-thienylmethylene malononitrile. The product has a melting point at 139.2–140.8° C. and a K max. in methanol=79.4 at 354μ.

II. Preparation of

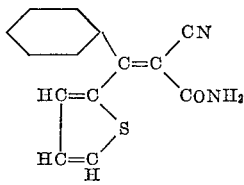

$\alpha$-cyano-$\beta$-phenyl-$\beta$-(2-thienyl) acrylamide

In a 500 ml. three-necked flask fitted with a stirrer, thermometer, Barrett type water separator (which allows the upper layer to be returned to the reaction flask), reflux condenser and heating mantle are added 47.28 grams of phenyl-2-thienyl ketone (M.W.=189, =0.25 mole), 21.0 grams of cyanoacetamide (M.W.=84, =0.25 mole), 4.0 grams of ammonium acetate, 24 mls. of glacial acetic acid and 50 mls. benzene. The reaction mixture is then heated to vigorous reflux and stirred for 55 hours at 98°–100° C. During this period 1.0 gram additions of ammonium acetate are made after 7 hours, 25 hours and 30 hours. The benzene is then steam distilled from the reaction mixture. The residue after steam distillation is filtered at 35° C. The solid material is washed on the funnel with 200 mls. of water and then ground in a mortar to break up lumps. This material is then heated to 75° C. with 250 mls. isopropanol, cooled to 5° C. After drying in air at 80° C. there is obtained 44.4 grams of $\alpha$-cyano-$\beta$-phenyl-$\beta$-(2-thienyl) acrylamide which melts at 195.3° C.–197° C.

Example 2

Example 1 is repeated except that the ketone employed in the preparation of the intermediate acrylamide is 5-bromo-2-thienyl ketone.

Example 3

Example 2 is repeated employing the following ketones:

(a) 3,4-dimethoxyphenyl-2-furyl ketone
(b) 2,6-dimethyl-3-pyridylphenyl ketone
(c) 4,5-dimethyl-3-pyrrylphenyl ketone
(d) 2,5-dimethyl-3-thienylphenyl ketone
(e) 2-furyl-o-tolyl ketone
(f) 2-methyl-1-naphthyl-2-thienyl ketone
(g) 1-naphthyl-2-pyridyl ketone
(h) phenyl-3-pyrazolyl ketone
(i) p-hydroxyphenyl-5-methyl-2-thienyl ketone
(j) 5-bromo-2-benzofuryl-p-bromophenyl ketone
(k) 2-methyl-1-naphthyl-2-thienyl ketone
(l) 3-allyl-4-hydroxyphenyl-5-ethyl-2-thienyl ketone
(m) 4-carboethoxyphenyl-2-thienyl ketone
(n) p-carboxamidophenyl-2-furyl ketone
(o) p-sulfamidophenyl-3-thienyl ketone

Example 4

The product of Example 1 is used in a nitrocellulose lacquer as follows:

A mixture of 20 parts of solution I and 80 parts of solution II is prepared wherein solution I consists of:

46 parts ½ sec. nitrocellulose
4 parts product of Example 1
35 parts of Cellolyn 502 (non-drying plasticizing alkyd resin of Hercules Powder Co.)
15 parts dibutyl phthalate and solution II consists of 35 parts butyl acetate
15 parts butanol
50 parts toluene The resulting lacquer solution is drawn out on a metal plate with a Bird film application to give a 3 mil film. A similar film is prepared without the product of Example 1. Upon exposure to ultraviolet light, the latter film yellows and deteriorates before any visible signs of yellowing are observed in the protected film.

Example 5

Example 2 is repeated employing as the ketone, p-(2-ethylhexyloxy)-phenyl-2-thienyl ketone.

Example 6

The product of Example 5 is incorporated into polyethylene by melting at 125° C. a mixture of 99.7 g. of polyethylene wax, PT-95504 (Semet-Solvay), and 0.3 g. of absorber. The material is then pressed out in a Carver press to give a film of about 0.03 in. thick. The polyethylene film is well stabilized to ultra-violet light and admirably protects food packaged therein.

Example 7

The product of Example 3(c) is incorporated into a synthetic latex as follows:

A 50% dispersion of the absorber of Example 3(e) is made by kneading 20 g. of the compound with 20 g. of formaldehyde-naphthalene-2-sodium sulfonate (Tamol NNO) in a Werner-Pfleiderer mixer for several hours in the presence of sufficient water to keep the material in a viscous state. The material is then evaporated to dryness to give the dispersed form of the absorber. The dispersed absorber is then incorporated into an acrylonitrile-butadiene latex (Chemigum 247) employing 5% of the absorber based on the weight of the latex. The latex is then sprayed onto leather. The film prepared in this manner shows less tendency to yellow on exposure to light than similar film prepared in the same manner but omitting the ultra-violet absorber.

Example 8

The product of Example 3(d) is prepared as a 3% solution in methyl Cellosolve and a sponge of polyvinyl chloride foam is impregnated therewith. The foam is prepared from the following formulation:

|  | Pts. |
|---|---|
| Marvinol VR–10 (polyvinyl chloride resin, U.S. Rubber) | 100 |
| Di-2-ethylhexylphthalate | 130 |
| Barium cadmium stabilizer (Advance BS–105) | 3.5 |
| Celogen (p,p' - oxybis(benzenesulfonyl)hydrazide) | 35 |
|  | 258.5 |

The sponge is squeezed free of solvent and dried. It is much more stable to ultra-violet light than untreated material.

Example 9

The product of Example 3(i) is oxyalkylated by adding 5 moles of ethylene to one mole of product containing 1.5% potassium hydroxide while maintaining the mixture in an autoclave at 80° C. The final product contains 5 oxyethyl groups.

Example 10

Example 9 is repeated using 10 moles of ethylene oxide. The final product contains 10 oxyethyl groups.

Example 11

Example 9 is repeated using 30 moles of ethylene oxide. The final product contains 30 oxyethyl groups.

Example 12

Example 9 is repeated using 100 moles of ethylene oxide. The final product contains 100 oxyethyl groups.

Example 13

Example 9 is again repeated employing 200 moles of ethylene oxide. The final product contains 200 oxyethyl groups.

Example 14

The final product of Example 10 is further reacted with 5 moles of propylene oxide to yield a product having 5 terminal oxypropyl groups.

Example 15

The product of Example 10 is dispersed in water (2 g./100 g. water) and is used to treat paper, cotton, and gelled regenerated cellulose. Excellent protection against ultra-violet light degradation is obtained.

Example 16

The product of Example 11 is employed in formulating liquid detergent as follows:

|  | Parts |
|---|---|
| Tetrapotassium pyrophosphate | 25 |
| Nonyl phenol+10 ethylene oxide condensate | 10 |
| Product of Example 11 | 2 |
| Sodium silicate | 3 |
| Carboxy methyl cellulose (low vis.) | 0.5 |
| KOH | 2 |
| Water | 57.5 |

The final formulation shows no degradation when exposed to ultraviolet light for 100 hours.

Example 17

2 g. of the product of Example 2 is mixed with 100 g. of granular high molecular weight formaldehyde polymer (Delrin). Excellent stabilization of the polymer is obtained.

The compounds of this invention are soluble in many diverse types of polymers, resins, waxes and the like, and therefore they are particularly suitable and adaptable for the stabilization of such materials as exemplified above. The non-oxyalkylated products are insoluble in water. Those compounds which contain lesser amounts of oxyalkyl groups, that is, up to about 4–6 groups per molecule, are in general less soluble in the non-polar solvents but are readily dispersible in water. The compounds containing larger amounts of alkylene oxide, that is, above about 6 moles thereof per mole of base compound, range from soluble in water with the solubility increasing as the number of oxyalkylene groups increases.

The ultra-violet absorbing compounds of the present invention may be used to stabilize all organic materials which are susceptible to ultra-violet degradation and are particularly useful in the stabilization of resins and plastics, whether they be in the form of films or molded products and either clear, opaque, semi-opaque or translucent. Foam, plastics and fibers are also admirably stabilized by these compounds. Pigments, polishes, creams, lotions, paints, enamels, varnish films and dyestuffs when susceptible to ultra-violet degradation have been found to be excellently stabilized by the compounds of the present invention. The amount of stabilizer to be incorporated in such compositions is not critical except that sufficient should be present to effect an acceptable degree of stabilization and no more should be used than is necessary to obtain such results. In general, between about 0.1% and 10% by weight based upon the organic solids weight to be stabilized may be used.

Other variations in and modifications of the described processes which will be obvious to those skilled in the art can be made in this invention without departing from the scope or spirit thereof.

We claim:

1. An essentially colorless compound exhibiting a prominent absorption peak between 250 mμ and 400 mμ of the formula:

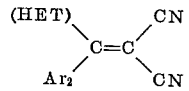

(a) wherein (HET) represents a heterocyclic nucleus containing at least one pair of conjugated double bonds and selected from the group consisting of 5- and 6-membered monocyclic heterocycles containing as the hetero atom at least one member selected from the group consisting of oxygen, nitrogen and sulfur, and the corresponding benzomonocyclic heterocycles, and (b) Ar₂ is an aromatic, carbocyclic nucleus of up to 14 carbon atoms, said nuclei being devoid of nitro and nuclear bonded amino groups.

2. A compound as defined in claim 1 wherein (HET) is monocyclic.

3. A compound as defined in claim 1 wherein (HET) is bicyclic.

4. A compound as defined in claim 1 wherein (HET) is a sulfur heterocycle.

5. A compound as defined in claim 1 wherein (HET) is a nitrogen heterocycle.

6. A compound as defined in claim 1 wherein (HET) is an oxygen heterocycle.

7. A compound as defined in claim 1 wherein Ar₂ is a phenyl nucleus.

8. A compound as defined in claim 1 wherein $Ar_2$ is a naphthyl nucleus.

9. A compound as defined in claim 1 wherein (HET) is a thienyl nucleus and $Ar_2$ is a phenyl nucleus.

10. A compound as defined in claim 1 wherein (HET) is a furyl nucleus and $Ar_2$ is a phenyl nucleus.

11. A compound as defined in claim 9 wherein (HET) is 2-thienyl and $Ar_2$ is phenyl.

12. A compound as defined in claim 9 wherein (HET) is 5-methyl-2-thienyl and $Ar_2$ is p-hydroxyphenyl.

13. A compound as defined in claim 9 wherein (HET) is 2,5-dimethyl-3-thienyl and $Ar_2$ is phenyl.

14. A compound as defined in claim 9 wherein (HET) is 2,5-dimethyl-3-thienyl and $Ar_2$ is p-ethylphenyl.

15. A compound as defined in claim 9 wherein (HET) is 2,5-dimethyl-3-thienyl and $Ar_2$ is p-methoxyphenyl.

16. A compound as defined in claim 10 wherein (HET) is 2-furyl and $Ar_2$ is 3,4-dimethoxyphenyl.

References Cited

UNITED STATES PATENTS

| | | | |
|---|---|---|---|
| 2,978,462 | 4/1961 | Berman et al. | 260—345.2 |
| 3,022,318 | 2/1962 | Berman et al. | 260—345.2 |
| 3,072,481 | 1/1963 | Berman et al. | 96—48 |
| 3,085,469 | 4/1963 | Carlson | 88—24 |

OTHER REFERENCES

Fieser et al., Organic Chemistry (Heath, Boston, 1950), pp. 238, 732.

Cotton et al., Adv. Inorg. Chem. (Interscience, 1962), pp. 385, 389.

NORMA S. MILESTONE, *Acting Primary Examiner.*

C. M. SHURKO, *Assistant Examiner.*